United States Patent
Guillot-Salomon et al.

(10) Patent No.: US 7,082,767 B2
(45) Date of Patent: Aug. 1, 2006

(54) PROCESS AND DEVICE FOR SUPPLYING THE TURBOJETS OF AN AIRCRAFT DURING AUTOMATIC FLIGHT

(75) Inventors: Damien Guillot-Salomon, Toulouse (FR); Nicolas Potagnik, Toulouse (FR)

(73) Assignee: AIRBUS France, Toulouse (FR)

( * ) Notice: Subject to any disclaimer, the term of this patent is extended or adjusted under 35 U.S.C. 154(b) by 201 days.

(21) Appl. No.: 10/898,313

(22) Filed: Jul. 26, 2004

(65) Prior Publication Data
US 2005/0028513 A1 Feb. 10, 2005

(30) Foreign Application Priority Data
Aug. 6, 2003 (FR) .................. 03 09698

(51) Int. Cl.
*F02C 9/28* (2006.01)

(52) U.S. Cl. ............. 60/773; 60/39.15; 60/39.281; 60/243

(58) Field of Classification Search ........... 60/39.15, 60/39.24, 39.281, 243, 773
See application file for complete search history.

(56) References Cited

U.S. PATENT DOCUMENTS

| | | | |
|---|---|---|---|
| 3,186,165 A * | 6/1965 | Edkins | 60/39.15 |
| 3,479,822 A | 11/1969 | Nelson et al. | |
| 4,296,601 A * | 10/1981 | Martin | 60/243 |
| 4,522,025 A | 6/1985 | Greune et al. | |
| 4,551,972 A * | 11/1985 | Lewis | 60/39.281 |
| 4,644,744 A | 2/1987 | Mittendorf et al. | |
| 5,224,340 A | 7/1993 | Snow | |
| 5,285,638 A | 2/1994 | Russ et al. | |
| 5,517,819 A * | 5/1996 | Martin | 60/243 |

OTHER PUBLICATIONS

Search Report dated Apr. 16, 2004.

* cited by examiner

*Primary Examiner*—Louis J. Casaregola
(74) *Attorney, Agent, or Firm*—Stevens, Davis, Miller & Mosher, LLP

(57) ABSTRACT

According to the invention, during level automatic flight of the aircraft (A) at steady altitude, the preset value EPRt, common to all the turbojets (M1 to M4) and corresponding to a particular value of the ratio EPR of the gas pressures at the outlet and at the inlet of the turbojets, is converted into a preset value N1t related to the speed of rotation N1 of the fan of said turbojets and the fuel supply to all said turbojets is slaved to said preset value N1t.

8 Claims, 2 Drawing Sheets

PROCESS AND DEVICE FOR SUPPLYING THE TURBOJETS OF AN AIRCRAFT DURING AUTOMATIC FLIGHT

The present invention relates to a process and a device for supplying fuel to the turbojets of a multijet aircraft flying in automatic pilot mode.

It is known that such turbojets are regulated by a reliable parameter, called the driving parameter, representative of the level of thrust of said turbojets and that there exist two kinds of driving parameters, one of which is the ratio EPR of the gas pressures at the outlet and at the inlet of the turbojets and the other of which is related to the speed N1 of their fan.

For a determined turbojet, the nature of the driving parameter, namely the ratio EPR or the speed N1, is fixed by the manufacturer of said turbojet.

As a function of the flight conditions (Mach number, altitude, pressure, temperature, etc.) and of the thrust demanded of a turbojet, a computer specifically associated with the latter computes a preset value for the driving parameter of said turbojet and manages the flow rate of fuel injected into the latter so as to align the measured value of said driving parameter with said preset value.

In particular when the aircraft is in automatic level flight at steady altitude, the thrust of said turbojets is managed automatically by the automatic thrust control system, which, as a function of said flight conditions, determines said preset value of the driving parameter of the engines. If the latter parameter is the EPR ratio, the automatic thrust control system determines a preset value EPRt and all the turbojets of the aircraft are slaved to this common preset value. However, although slaved in common to this preset value EPRt, said turbojets exhibit, on account of their differences of positioning in the aerodynamic flow around the aircraft, different speeds of rotation of their fans. This results in vibrations, especially sound vibrations, in the aircraft, impairing the comfort of the passengers and of the crew.

An object of the present invention is to remedy this drawback.

To this end, according to the invention, the process for supplying fuel to the turbojets of a multijet aircraft flying in automatic pilot mode, according to which process the fuel supply to each of said turbojets is slaved to a preset value EPRt, common to all said turbojets and corresponding to a particular value of the ratio EPR of the gas pressures at the outlet and at the inlet of the turbojets, said preset value EPRt depending on the automatic thrust order and on the flight conditions of the aircraft, is noteworthy in that, when said aircraft is in level flight at steady altitude, said common preset value EPRt is converted into a preset value N1$t$ related to the speed of rotation N1 of the fan of said turbojets and in that the fuel supply to all said turbojets is slaved to said preset value N1$t$.

Thus, in this flight case, the fans of all the turbojets of the aircraft are slaved to the same speed of rotation, thereby eliminating the above-mentioned vibrations.

It will be noted that the implementation of the present invention:

necessitates converting the preset value EPRt into a preset value N1$t$, this being easy since the manufacturers of turbojets provide conversion tables which, for various flight parameters such as altitude, Mach number, pressure, temperature, etc., indicate the value of the speed of rotation N1 corresponding to a value of the EPR parameter;

necessitates the measurement of the parameter N1 on said turbojets so as to be able to slave the speed of rotation of their fan to the preset value N1$t$; however, for other purposes, such a measurement is carried out systematically on the turbojets whose driving parameter is the EPR ratio, so that the measurement of the parameter N1 is already available on board the aircraft; and somewhat degrades the performance of the turbojets, since regulation with the aid of the driving parameter N1 of a turbojet whose driving parameter is, by design, the EPR ratio cannot be optimal. Also, to avoid detrimental consequences of such a degraded mode of operation, the replacement of the preset value EPRt by the preset value N1$t$ is advantageously subject to one or more additional conditions.

One of them is that the Mach number of the aircraft is greater than a first threshold short of which said turbojets could operate too far below their performance. Such a first threshold may be of the order of Mach 0.45.

Another of these additional conditions may reside in that the differences between, on the one hand, the maximum value of the ratio EPR at which the turbojets can operate and, on the other hand, each of the current values of this ratio, measured for each of the turbojets, are greater than a second threshold short of which said turbojets could not maintain the speed of the aircraft. Such a second threshold may be at least approximately equal to 0.02.

In a known manner, the system for supplying fuel to the turbojets of a multijet aircraft flying in automatic pilot mode, the driving parameter of each of said turbojets being the ratio EPR of the gas pressures at the outlet and at the inlet of the corresponding turbojet and said aircraft comprising:

means for measuring the current value of said driving parameter EPR for each of said turbojets;

means for measuring the current value of the speed of rotation N1 of the fan of each of said turbojets, consists of a plurality of supply devices each of which is associated with one of said turbojets and comprises:

a first computer producing, on the basis of the automatic thrust order and of the current flight conditions, a preset value EPRt for said driving parameter EPR, said preset value EPRt being identical for all the turbojets;

a slaving device receiving said preset value EPRt and the corresponding current measured value of said driving parameter EPR and tending to align said current measured value with said preset value EPRt;

a second computer controlled by said slaving device and computing the flow rate of fuel to be fed to said engine so as to align said current measured value of the driving parameter with the preset value EPRt; and fuel supply means controlled by said second computer and delivering to said engine the flow rate of fuel computed by the latter.

In accordance with the present invention, such a fuel supply system is noteworthy in that:

each supply device comprises, in parallel with said device for slaving to said preset value EPRt, the arrangement in series:

of a conversion table, identical for all said supply devices and connected to said first computer so as to receive said preset value EPRt, said conversion table being able to convert said preset value EPRt into a preset value N1$t$ of said speed of rotation N1; and of a slaving device receiving said preset value N1$t$ and the corresponding current measured value of said speed of rotation N1 intended to align this current measured value with said preset value N1$t$; and each supply device comprises, between said devices for slaving to the preset values EPRt and N1t, on the one hand, and said second computer, on the other hand, a switching means able to connect to the latter, in a first state, said slaving device associated with the preset value EPRt, and, in a second state, said slaving device associated with the preset value N1t; and said switching means are controlled in common by a control device so as to toggle from said first state to said second state when the aircraft is in automatic level flight at steady altitude.

Advantageously, such a control device is of the AND gate type, delivering a switching order only when all its inputs, which receive among other things signals representative of the fact that the aircraft is in automatic flight and that this flight is level at steady altitude, are supplied. Conversely, by virtue of such a structure of said control device, said switching means revert from said second state to said first state as soon as one of said representative signals disappears.

Preferably, in order to avoid any untimely and premature toggling of the switching means from their first state to their second state, a timeout device is provided between said control device and said switching means.

It goes without saying that these switching means may exhibit any possible technological form, preferably of the solid type.

The figures of the appended drawing will elucidate the manner in which the invention may be embodied. In these figures, identical references designate similar elements.

Figure 1:
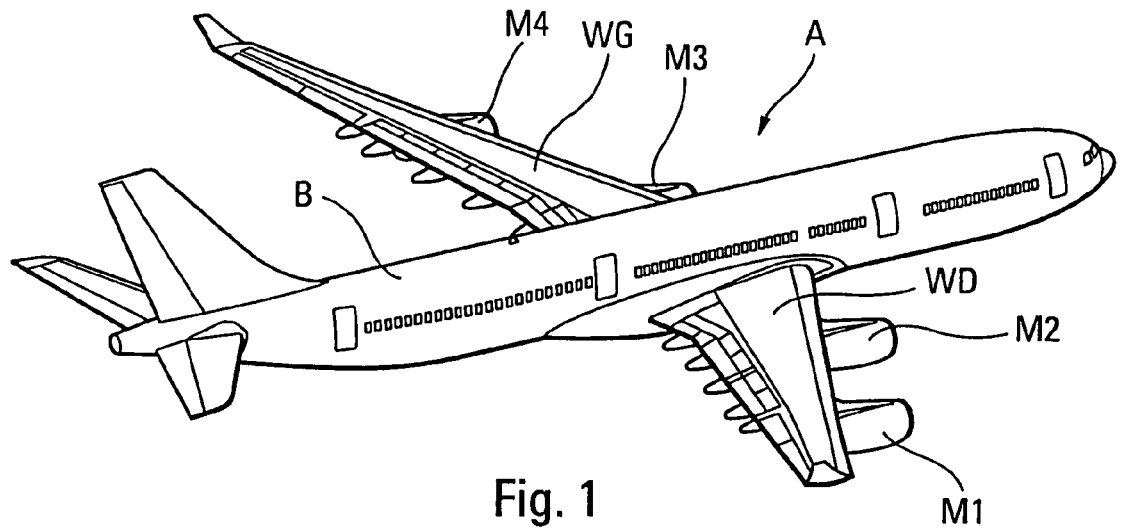
FIG. 1 shows in perspective a four-engine wide-bodied jet aircraft.

The aircraft A shown diagrammatically in FIG. 1 comprises two wings WD and WG, symmetric to one another with respect to the fuselage B of said aircraft. The wing WD carries an outboard engine M1 and an inboard engine M2. Likewise, the wing WG carries an inboard engine M3 and an outboard engine M4.

Figure 2:
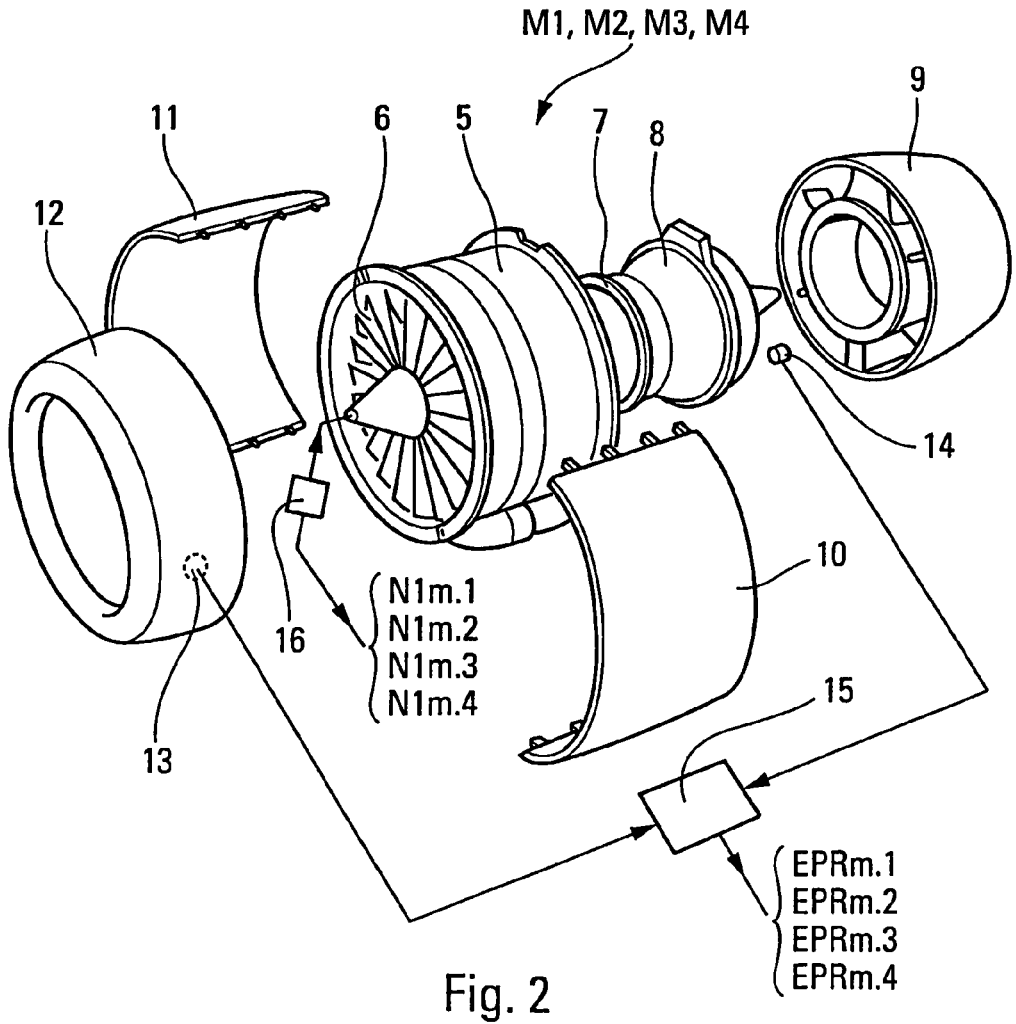
FIG. 2 is a diagrammatic exploded perspective view of any one of the turbojets of the aircraft of FIG. 1.

As is shown diagrammatically in FIG. 2, each engine M1 to M4 is of the bypass turbojet type and comprises, in a known manner, a central hot air generator 5, a fan 6, compressor stages 7, a turbine 8, a nozzle assembly 9, two lateral cowlings 10 and 11 and an air inlet cowling 12.

In a likewise known manner, the driving parameter of each of said engines—which parameter is representative of the level of thrust of the corresponding engine—is that known in aeronautics by the term EPR (Engine Pressure Ratio) and which is equal to the ratio of the gas pressure at the outlet of the turbine 8 to the gas pressure in the air inlet cowling 12. A measurement EPRm.1 to EPRm.4 of this driving parameter, respectively for the engines M1 to M4, is obtained by disposing a pressure sensor 13 in the air inlet cowling 12 and a pressure sensor 14 at the outlet of the turbine 8 and by feeding the measurements of said sensors 13 and 14 to a divider 15.

Moreover, a speed of rotation sensor 16 is provided to give the measurement N1m.1 to N1m.4 of the speed of rotation N1 of the fan 6 of each of said engines M1 to M4, respectively.

Figure 3:
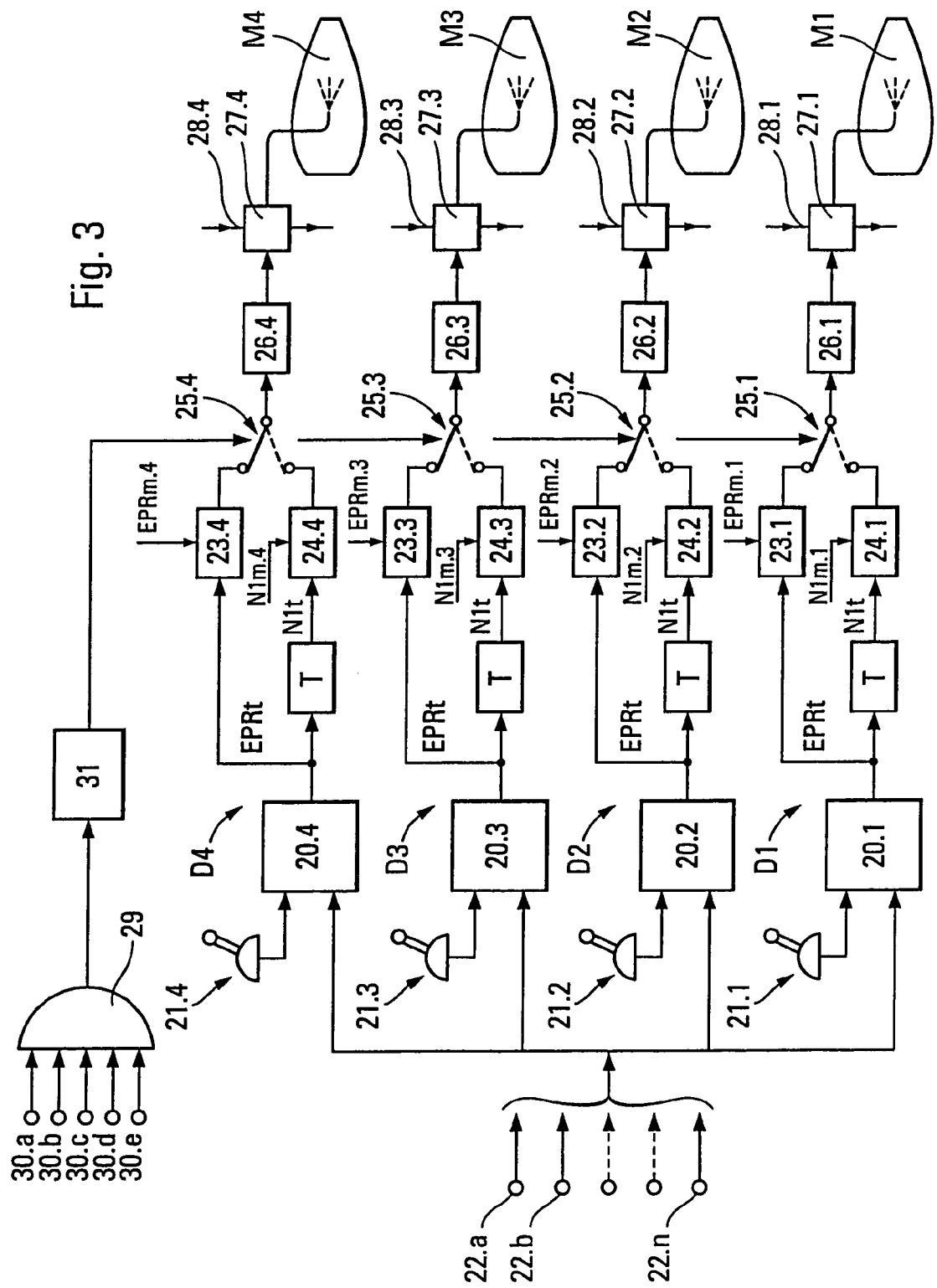
FIG. 3 is the schematic diagram of the fuel supply system of said turbojets, in accordance with the present invention.

The fuel supply system of the turbojets M1 to M4 is illustrated diagrammatically by FIG. 3, in which it may be seen that this system consists of four supply devices D1 to D4, respectively associated with the turbojets M1 to M4.

Each supply device D1 to D4 comprises:

a first computer 20.1 to 20.4 receiving, on the one hand, the common automatic thrust order corresponding to the positions of the throttles 21.1 to 21.4 and, on the other hand, the current flight conditions appearing on inputs 22.a, 22.b, etc., 22.n. These current flight conditions are measurements of, for example, the Mach number at which the aircraft A is flying, the latter's flight altitude, the pressure and the temperature of the environment of said aircraft, etc. On the basis of this input information, each first computer 20.1 to 20.4 computes a preset value EPRt for said driving parameter EPR, this preset value being identical for all the devices D1 to D4;

a first slaving device 23.1 to 23.4 receiving said preset value EPRt and the current measured value EPRm.1 to EPRm.4 of said driving parameter EPR. An object of the first slaving device 23.1 to 23.4 is to tend to align said current measured value EPRm.1 to EPRm.4 with the said preset value EPRt;

a circuit branch, arranged in parallel with said first slaving device 23.1 to 23.4 and comprising:

a table T, identical for all the devices D1 to D4, receiving, on the one hand (in a manner not represented for the purposes of clarity) the flight conditions appearing on the inputs 22.a to 22.n, and, on the other hand, said preset value EPRt of said first computer 20.1 to 20.4 and able to convert said preset value EPRt into a preset value N1t of said speed of rotation N1 of the fans 6; and a second slaving device 24.1 to 24.4 receiving said preset value N1t and the corresponding current measured value N1m.1 to N1m.4. An object of the slaving device 24.1 to 24.4 is to tend to align said current measured value N1m.1 to N1m.4 with the preset value N1t;

a controllable switching means 25.1 to 25.4 connected, in a first state, to the output of said first slaving device 23.1 to 23.4 and, in a second state, to the output of said second slaving device 24.1 to 24.4;

a second computer 26.1 to 26.4 controlled, according to the state of the controllable switching means 25.1 to 25.4, either by the first slaving device 23.1 to 23.4 or by the second slaving device 24.1 to 24.4, and computing the flow rate of fuel to be fed to the engine M1 to M4 so as to align the current measured value EPRm.1 to EPRm.4 or N1m.1 to N1m.4 of the driving parameter EPR or N1 with the preset value EPRt or N1t; and fuel supply means (electrovalves) 27.1 to 27.4, in conjunction with an oxidizer circuit 28.1 to 28.4, which means are controlled by said second computer 26.1 to 26.4 and deliver to the engine M1 to M4 the flow rate of fuel computed by the latter.

Moreover, the fuel supply system comprises a control device 29, for example of the AND gate type, for controlling the switching means 25.1 to 25.4 in common. The inputs 30.a to 30.e of said control device 29 receive electric signals respectively representative:

of the fact that the aircraft A is in automatic pilot mode;

of the fact that the standard driving parameter of the engines M1 to M4 is the EPR parameter;

of the fact that the aircraft A is flying level at steady altitude;

of the fact that the Mach number at which the aircraft A is flying is at least equal to a threshold, for example equal to Mach 0.45; and of the fact that the differences between, on the one hand, the maximum value of the EPR ratio at which the turbojets M1 to M4 can operate and, on the other hand, each of the current values EPRm.1 to EPRm.4 of this ratio are greater than a threshold, for example equal to 0.02, short of which said turbojets could not maintain the speed of the aircraft A.

A timeout device 31 may be disposed between the control device 29 and the switching means 25.1 to 25.4, so as to avoid transient untimely control of said means.

Thus, when the conditions appearing at the inputs 30.a to 30.d of the control device 29 do not all hold, the switching means 25.1 to 25.4 are in their first state and the engines M1 to M4 are regulated with the preset value EPRt.

In this case, it may happen that the speeds of rotation N1 of the fans 6 of the turbojets M1 to M4 are different, thereby producing vibrations in the aircraft A. Such vibrations appear in particular when the fan 6 of an outboard turbojet M1 (or M4) does not exhibit the same speed of rotation as that of the corresponding inboard turbojet M2 (or M3). This results in vibrations in the corresponding wing WD (or WG), with transmission by the latter of said vibrations to the fuselage B.

On the other hand, as soon as these conditions are achieved simultaneously, the control device 29 causes the switching means 25.1 to 25.4 to switch, with the delay afforded by the timeout device 31, said means then taking their second state. The engines M1 to M4 are then regulated with the preset value N1t.

As a result, the fans 6 of all the turbojets M1 to M4 all rotate at the same speed N1, thereby eliminating the above-mentioned vibrations.

As soon as one of said conditions disappears, the switching means 25.1 to 25.4 resume their first state and the engines M1 to M4 are again regulated with the preset value EPRt.

Although, in FIG. 2, the switching means 25.1 to 25.4 have been represented in a symbolically figurative manner, it goes without saying that these switching means may take any other form of embodiment.

The invention claimed is:

1. A process for supplying fuel to the turbojets (M1 to M4) of a multijet aircraft (A) flying in automatic pilot mode, according to which process the fuel supply to each of said turbojets is slaved to a preset value EPRt, common to all said turbojets and corresponding to a particular value of the ratio EPR of the gas pressures at the outlet and at the inlet of the turbojets, said preset value EPRt depending on the automatic thrust order and on the flight conditions of the aircraft,
wherein, when said aircraft (A) is in level flight at steady altitude, said common preset value EPRt is converted into a preset value N1t related to the speed of rotation N1 of the fan of said turbojets and wherein the fuel supply to all said turbojets is slaved to said preset value N1t.

2. The process as claimed in claim 1,
wherein the replacement of the preset value EPRt by the preset value N1t is moreover subject to the condition that the Mach number of the aircraft (A) is greater than a first threshold short of which said turbojets could operate below their performance.

3. The process as claimed in claim 2,
wherein said first threshold is at least approximately equal to Mach 0.45.

4. The process as claimed in claim 1,
wherein the replacement of the preset value EPRt by the preset value N1t is moreover subject to the condition that the differences between, on the one hand, the maximum value of the ratio EPR at which said turbojets (M1 to M4) can operate and, on the other hand, each of the current values (EPRm.1 to EPRm.4) of this ratio, measured for each of said turbojets, are greater than a second threshold short of which said turbojets could not maintain the speed of said aircraft.

5. The process as claimed in claim 4,
wherein said second threshold is at least approximately equal to 0.02.

6. A system for supplying fuel to the turbojets (M1 to M4) of a multijet aircraft (A) flying in automatic pilot mode, the driving parameter of each of said turbojets being the ratio EPR of the gas pressures at the outlet and at the inlet of the corresponding turbojet and said aircraft comprising:
   means (13 to 15) for measuring the current value (EPRm.1 to EPRm.4) of said driving parameter EPR for each of said turbojets;
   means (16) for measuring the current value (N1m.1 to N1m.4) of the speed of rotation N1 of the fan of each of said turbojets,
while said supply system consists of a plurality of supply devices (D1 to D4) each of which is associated with one of said turbojets and comprises:
   a first computer (20.1 to 20.4) producing, on the basis of the automatic thrust order and of the current flight conditions, a preset value EPRt for said driving parameter EPR, said preset value EPRt being identical for all the turbojets (M1 to M4);
   a slaving device (23.1 to 23.4) receiving said preset value EPRt and the corresponding current measured value (EPRm.1 to EPRm.4) of said driving parameter EPR and tending to align said current measured value with said preset value EPRt;
   a second computer (26.1 to 26.4) controlled by said slaving device (23.1 to 23.4) and computing the flow rate of fuel to be fed to said engine so as to align said current measured value of the driving parameter with the preset value; and
   fuel supply means (27.1 to 27.4) controlled by said second computer and delivering to said engine the flow rate of fuel computed by the latter,
wherein:
   each supply device (D1 to D4) comprises, in parallel with said device (23.1 to 23.4) for slaving to said corresponding preset value EPRt, the arrangement in series:
      of a conversion table (T), identical for all said supply devices (D1 to D4) and connected to said first computer (20.1 to 20.4) so as to receive said preset value EPRt, said conversion table (T) being able to convert said preset value EPRt into a preset value N1t of said speed of rotation N1; and
      of a slaving device (24.1 to 24.4) receiving said preset value N1t and the corresponding current measured value (N1m.1 to N1m.4) of said speed of rotation N1 intended to align this current measured value with said preset value N1t; and
   each supply device (D1 to D4) comprises, between said devices (23.1 to 23.4–24.1 to 24.4) for slaving to the preset values EPRt and N1t, on the one hand, and said second computer (26.1 to 26.4), on the other hand, a switching means (25.1 to 25.4) able to connect to the latter, in a first state, said slaving device (23.1 to 23.4) associated with the preset value EPRt, and, in a second state, said slaving device (24.1 to 24.4) associated with the preset value N1t; and
   said switching means (25.1 to 25.4) are controlled in common by a control device (29) so as to toggle from said first state to said second state when the aircraft (A) is in automatic level flight at steady altitude.

7. The system as claimed in claim 6,
wherein said control device (29) is of the AND gate type, delivering a switching order to said switching means (25.1 to 25.4) only when all its inputs (30.*a* to 30.*d*) are supplied.

8. The system as claimed in claim 6,
wherein a timeout device (31) is disposed between said control device (29) and said switching means (25.1 to 25.4).

* * * * *